United States Patent [19]
Kitajima et al.

[11] Patent Number: 5,144,467
[45] Date of Patent: Sep. 1, 1992

[54] OPTICAL TUNING METHOD AND APPARATUS SUITABLE FOR SELECTIVE RECEPTION OF OPTICAL FREQUENCY DIVISION MULTIPLEX SIGNALS

[75] Inventors: Shigeki Kitajima, Kokubunji; Kiichi Yamashita, Kanagawa; Shinya Sasaki, Kodaira; Hideaki Tsushima, Hachioji, all of Japan

[73] Assignee: Hitachi, Ltd., Tokyo, Japan

[21] Appl. No.: 557,721

[22] Filed: Jul. 25, 1990

[30] Foreign Application Priority Data
Jul. 28, 1989 [JP] Japan .................. 1-194098

[51] Int. Cl.⁵ .................. H04J 14/02; H04B 10/06
[52] U.S. Cl. .................. 359/124; 359/189
[58] Field of Search .................. 370/3; 455/619, 616, 455/150, 160, 161, 164, 255, 257, 316; 372/20, 24; 359/189, 190, 191, 194, 154, 124, 127

[56] References Cited
U.S. PATENT DOCUMENTS
4,748,683  5/1988  Sato .................. 455/164
4,912,527  3/1990  Yamazaki .................. 370/3

FOREIGN PATENT DOCUMENTS
0114533  7/1983  Japan .................. 455/255
0203026  8/1988  Japan .................. 370/3
0164135  6/1989  Japan .................. 370/3

Primary Examiner—Edward L. Coles, Sr.
Assistant Examiner—Kinfe-Michael Negash
Attorney, Agent, or Firm—Antonelli, Terry, Stout & Kraus

[57] ABSTRACT

An optical tuning device including a channel designator and an intermediate frequency stabilizer for stabilizing the frequency of a difference signal corresponding to the frequency difference between a transmitted optical signal and a local oscillation optical signal. The channel designator includes a bias control circuit for continuously changing the optical frequency of a local oscillation light source up to a frequency corresponding to a target channel, a channel detection circuit for detecting channel passage on the basis of the difference signal, and a channel counting circuit for storing therein the selected channel and the target channel, detecting the direction of the target channel, counting the number of channel passage times, and detecting arrival at the target channel.

12 Claims, 12 Drawing Sheets

OPTICAL FREQUENCY CHANNELS

CHANNEL TO BE SELECTED AFTER SHIFT

CHANNEL TO BE SELECTED AFTER SHIFT

VALUES OF SELECTED CHANNEL COUNTER AND TARGET CHANNEL REGISTER

LOCAL OSCILLATION AND TRANSMISSION OPTICAL SIGNALS

INTERMEDIATE FREQUENCY SIGNAL

OUTPUT OF CHANNEL DETECTION CIRCUIT

OUTPUT OF CLOCK GENERATOR

TIME →

VALUE OF CHANNEL
DIFFERENCE COUNTER

LOCAL OSCILLATION
AND TRANSMISSION
OPTICAL SIGNALS

INTERMEDIATE
FREQUENCY SIGNAL

OUTPUT OF CHANNEL
DETECTION CIRCUIT

OUTPUT OF CLOCK
GENERATOR

TIME

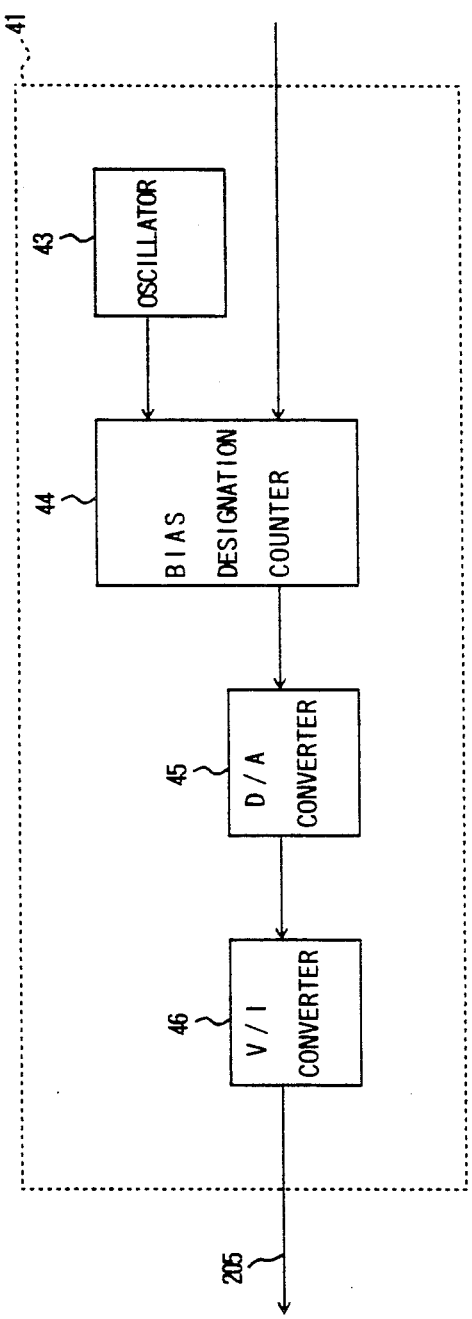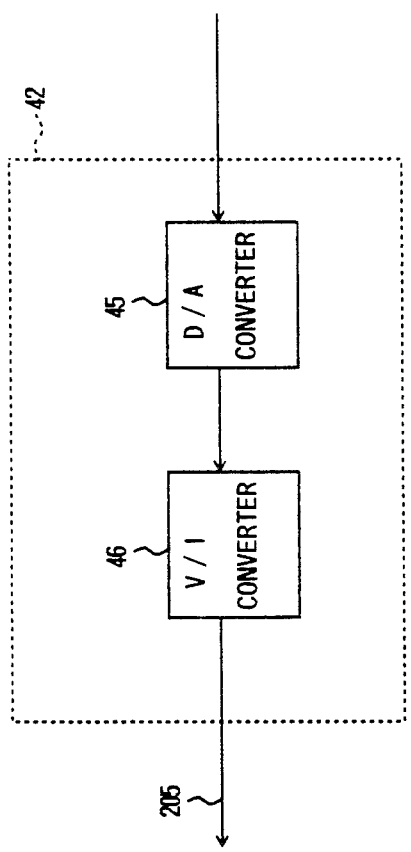
FIG. 9A
FIG. 9B

① OPTICAL FREQUENCY CHANNELS
② OPTICAL FREQUENCY
③ VARIATION
④ CONTROL CURRENT

OPTICAL TUNING METHOD AND APPARATUS SUITABLE FOR SELECTIVE RECEPTION OF OPTICAL FREQUENCY DIVISION MULTIPLEX SIGNALS

BACKGROUND OF THE INVENTION

The present invention generally relates to optical fiber communications and, more particularly, to a heterodyne or homodyne detection/reception system which is suitable for selective reception of optical FDM (frequency division multiplex) signals.

A coherent optical frequency division multiplex communication system has been suggested as a means for providing in the future long-distance and large-capacity communication, since such a system enables high-density optical FDM broadcasting and remarkable optical reception sensitivity when compared with a conventional light-intensity direct-detection communication system for modulating and detecting the intensity of light from a light source.

A conventional system for selectively receiving one channel from an optical multi-channel FDM signal, for example, a system entitled "COHERENT OPTICAL CATV, A 10-CHANNEL FOR TRANSMISSION EXPERIMENT", Shibutani et al. is disclosed in "Institute of Electronics, Information and Communication Engineers", OQE 88-70, pp 45-52, 1988.

FIG. 2 shows an optical channel selection section 40 in a prior art system, in which, a signal 201 is supplied to a frequency discriminator 15 so that an optical frequency of an optical signal 202 emitted from a local oscillation light source 6 is controlled by a random access controller 17 through the frequency discriminator 15, a sweeper 16 and a channel selector 18. Shown in FIGS. 3A, 3B and 3C are graphs showing relationships between local oscillation optical frequencies and optical frequency control current of the local oscillation light source 6 (which current will be referred to merely as the control current) with respect to optical frequency channel positions set at the transmitter side.

More specifically, FIG. 3A shows the relationship between the control current and the optical frequency at the time of starting the system. First, the control current or optical frequency of the local oscillation light source 6 is swept by the sweeper 16 so that channel positions A to D are stored in the form of values a to d of the control current producing light beat.

The random access controller 17 usually automatically controls the frequency of the control current (performs so-called automatic frequency control (AFC)) on the basis of a signal received from the frequency discriminator 15 in such a manner that the difference in optical frequency between the local oscillation light source 6 and selected channel is constant. The random access controller 17, when receiving a channel request signal from the channel selector 18, stops its AFC operation, shifts the control current to a level corresponding to a desired channel stored at the time of starting the system, seizes the closest one of the channels corresponding to the shifted control current value, and again switches to its usual AFC operation.

FIG. 3B shows the relationship between the control current and optical frequency when channel shift is carried out from the selected channel A to a desired channel D. In this case, the random access controller 17 shifts the value a of the control current corresponding to the selected channel A to the value d thereof stored for the desired channel D, and selects the closest one (in this example, channel D) of the channels corresponding to the shifted value.

FIG. 3C shows a state in which optical frequencies of transmission and local oscillation light are shifted from A, B, C and D to A', B', C' and D'. In the prior art system, when channel selection is carried out substantially in the same manner as in FIG. 3B, even shift of the control current to its previously stored value d under the random access controller 17 causes erroneous selection of not the channel D but of the closest channel C'.

Even under a condition such that the optical frequency is not varied, the system is caused to be erroneously operated under the influence of variations in the characteristics of the local oscillation light source, or the like, with time during its continuous operation.

In the prior art system, in order to avoid such erroneous operation as explained in connection with FIG. 3C, it has been necessary to restrictively set variations in the frequencies of transmission and local oscillation light within a range determined by channel spacing.

SUMMARY OF THE INVENTION

It is an object of the present invention to provide an optical tuning method for optically selecting a desired channel which can operate a system non-erroneously even when an optical frequency variation range of the transmission signal exceeds the channel spacing and which can avoid the influences of variations in the characteristics of a local oscillation light source, and so on, with time.

Another object of the present invention is to provide an optical tuning device embodying the above method.

A further object of the present invention is to provide an optical frequency division multiplex transmission system.

The above first object is attained by scanning the optical frequency of light from a local oscillation light source in a target channel direction, counting the number of channel passage times, detecting an arrival at the target channel and changing to the target channel.

The above second object is attained by providing an optical tuning device which comprises an optical frequency control circuit, a channel detection circuit and a channel counting circuit.

The above third object is attained by providing an optical reception system including the above optical tuning device and an optical transmission system.

In the first aspect of the present invention, since the optical frequency of the local oscillation light is scanned in one direction to monitor the passage of the channels in a channel change mode, the local oscillation optical frequency is always associated with a transmission light signal so that, even when a variation occurs between the optical frequencies of the transmission and local oscillation light, channel change can be accomplished without erroneous operation. Further, since the scanning of the local oscillation optical frequency in one direction is the control less effected by variations in the characteristics of the light source, the control circuit can be simplified.

In the optical tuning device, the channel counting circuit functions to store the selected and target channels therein to detect the direction toward the target channel, while the optical frequency control circuit functions to start scanning the optical frequency of the local oscillation light source in the target channel direction. The channel detection circuit of the optical tuning device detects channel passage on the basis of a difference frequency signal (intermediate frequency signal) corresponding to the frequency difference between the transmission and local oscillation light signals, the channel counting circuit counts the number of channel passage times and detects the arrival at the target channel, and then the optical frequency control circuit stops the scanning of the optical frequency of the local oscillation light source. In this manner, the optical tuning device embodying the optical tuning method of the present invention can be implemented.

Further, the optical tuning device of the present invention can be combined with an optical reception device to form an optical frequency division multiplex reception system which can select a desired channel. Furthermore, the optical reception system can be combined with an optical transmission system and an optical transmission line to obtain an optical frequency division multiplex transmission system.

The aforementioned first object is attained alternatively by detecting the optical frequency of light of the local oscillation light source corresponding to the optical frequency of a selected channel to use it as a reference optical frequency, calculating an optical frequency difference from a desired channel on the basis of a known channel spacing, and adding the calculated optical frequency difference to the detected reference optical frequency to obtain a target optical frequency. In this connection, the detection of the local oscillation optical frequency and the output of the target frequency are accomplished by previously storing a relationship between the optical frequency and control current of the local oscillation light source.

The local oscillation optical frequency is controlled so as to have a constant spacing from the optical frequency of the selected channel, and thus when a variation in the optical frequency takes place at the transmitter or receiver side, the local oscillation frequency is varied with the change of the optical frequency of the selected channel.

In the channel shift, the optical frequency of the local oscillation light source (receiver side) associated with the selected channel (transmitter side) is detected to use it as a reference optical frequency. Next, the known channel spacing already stabilized at the transmitter side is used to compute an optical frequency difference between the selected and desired channels at the receiver side. When the optical frequency difference is added to the above reference optical frequency, the target optical frequency of the local oscillation light source can be accurately obtained.

Further, when a relationship between the optical frequency and control current of the local oscillation light source is previously stored then rather than, the detection of the local oscillation optical frequency the detection of the control current to the local oscillation light source.

In addition, the value of control current corresponding to the target optical frequency is calculated with use of the relationship between the optical frequency and control current of the local oscillation light source, and the calculated control current is supplied to the local oscillation light source to thereby set the target optical frequency.

As a result, even when a variation takes place between the transmission optical frequency and the local oscillation optical frequency, channel selection can be accomplished without any erroneous operation.

Figure 10:
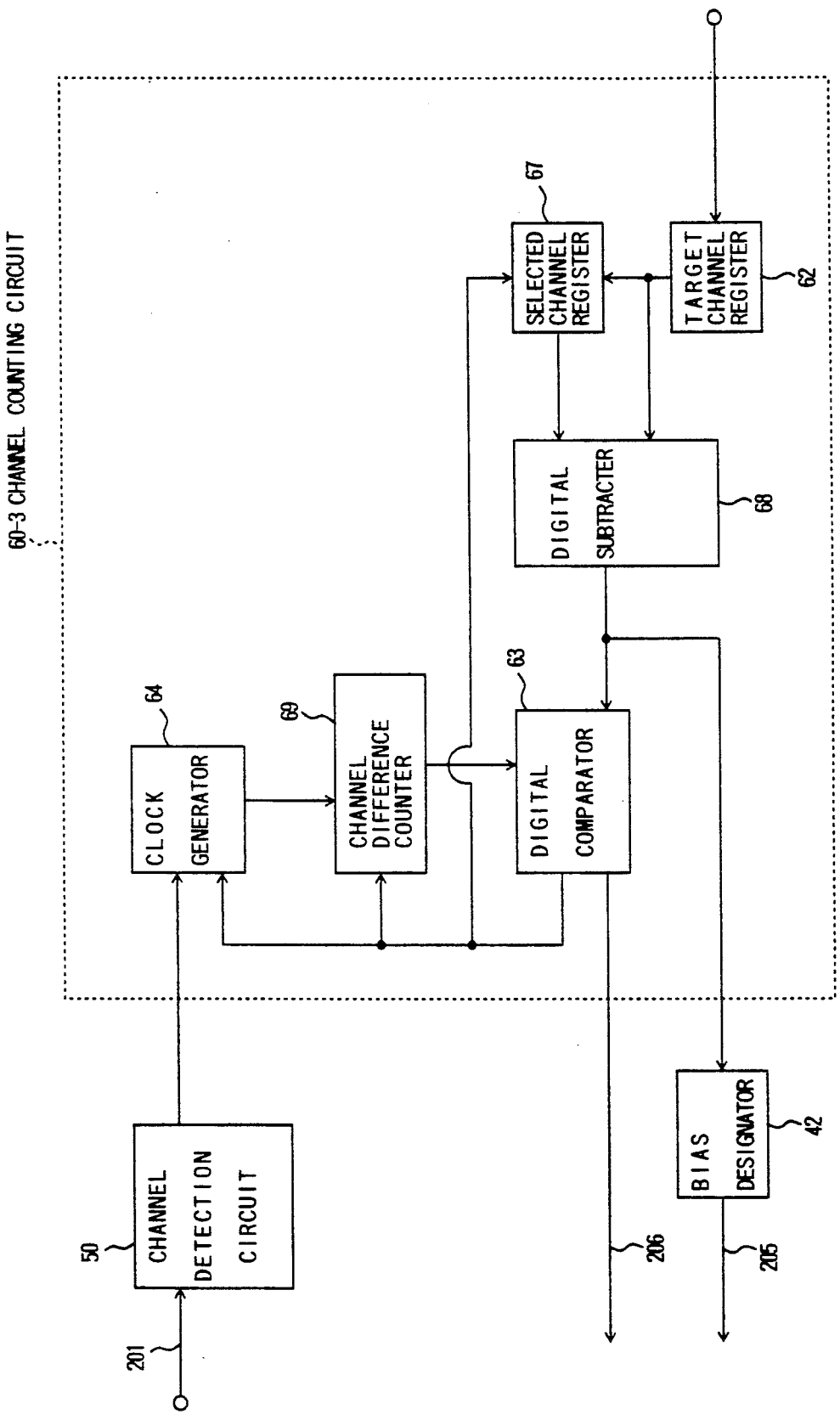
Figure 11:
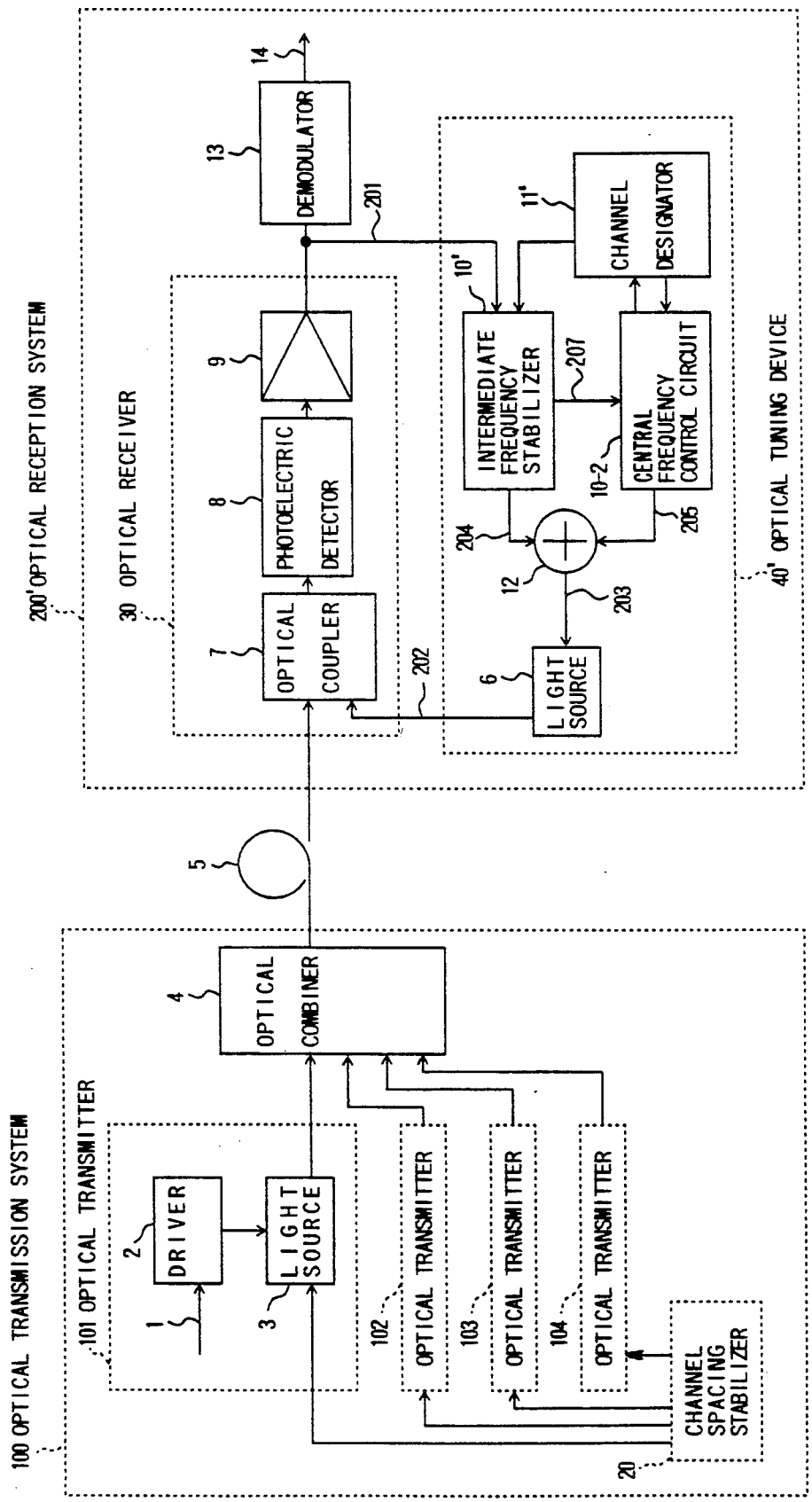
Figure 12:
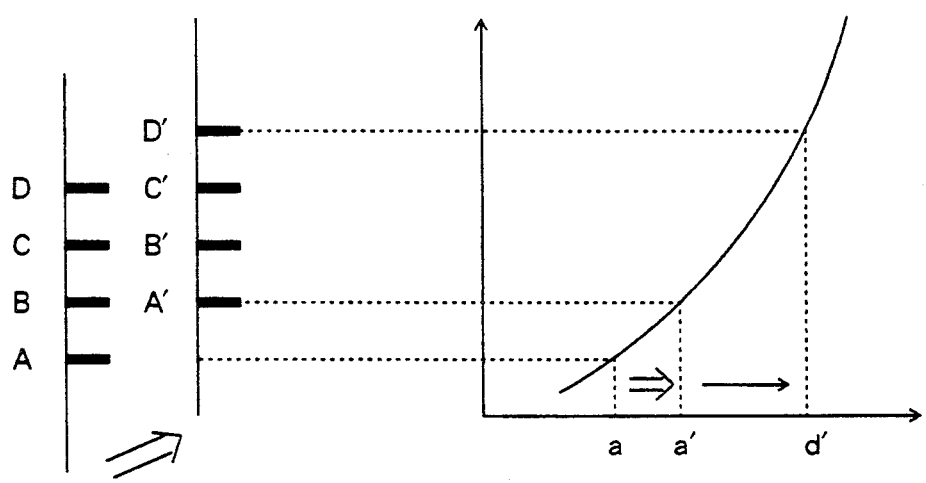

FIGS. A and 9B are block diagrams of a bias scanning circuit and a bias designation circuit;

FIG. 10 is a block diagram of a modification of the channel designation portion in the second embodiment;

FIG. 11 is a block diagram of an optical communication system in accordance with a second embodiment of the present invention; and FIG. 12 is a graph showing the relationship between local oscillation optical frequency and control current with optical frequency positions allocated to channels in the second embodiment of the present invention.

DESCRIPTION OF THE PREFERRED EMBODIMENTS

Figure 1:
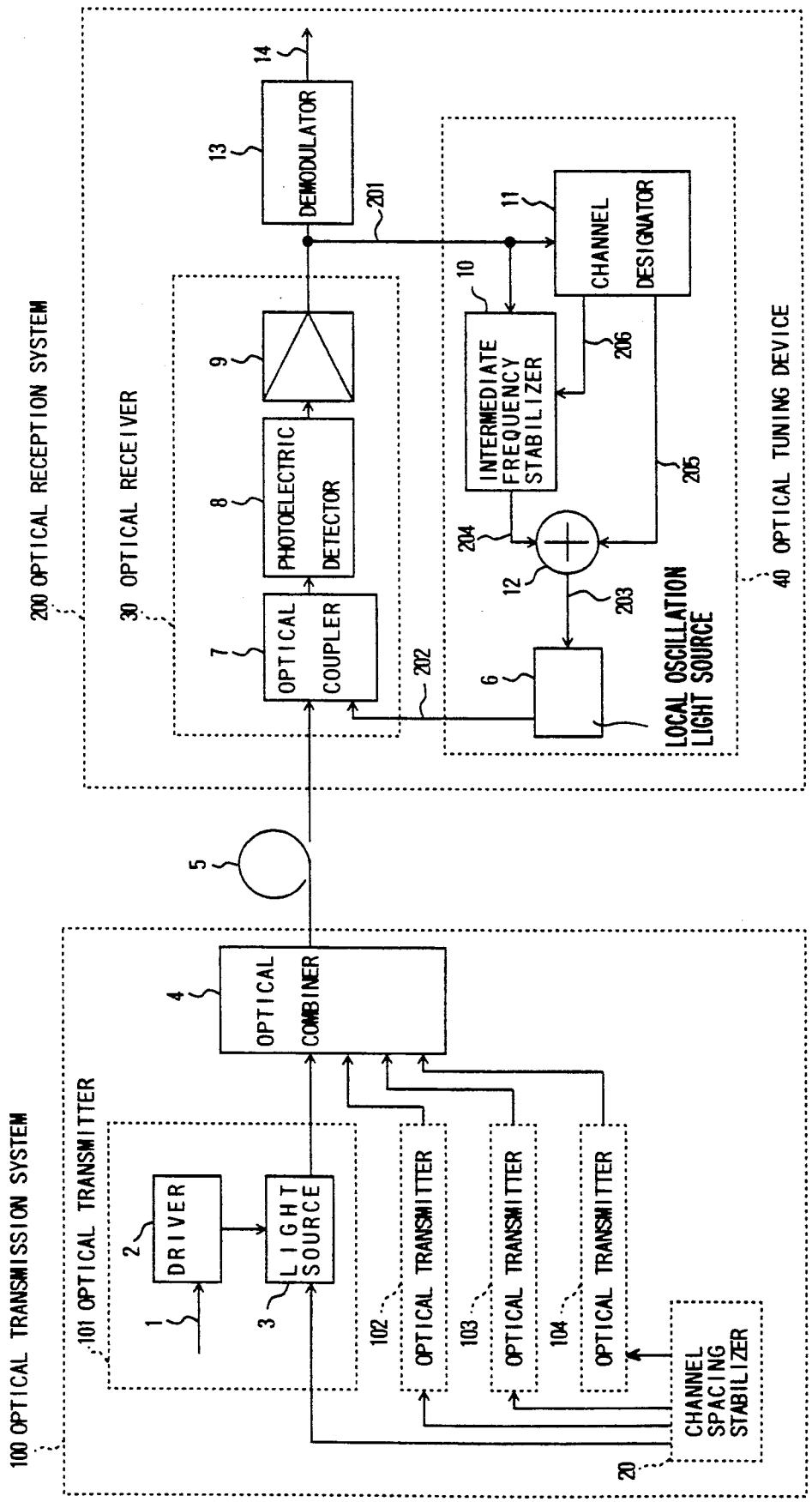
FIG. 1 is a block diagram of an optical communication system in accordance with a first embodiment of the present invention.
Figure 2:
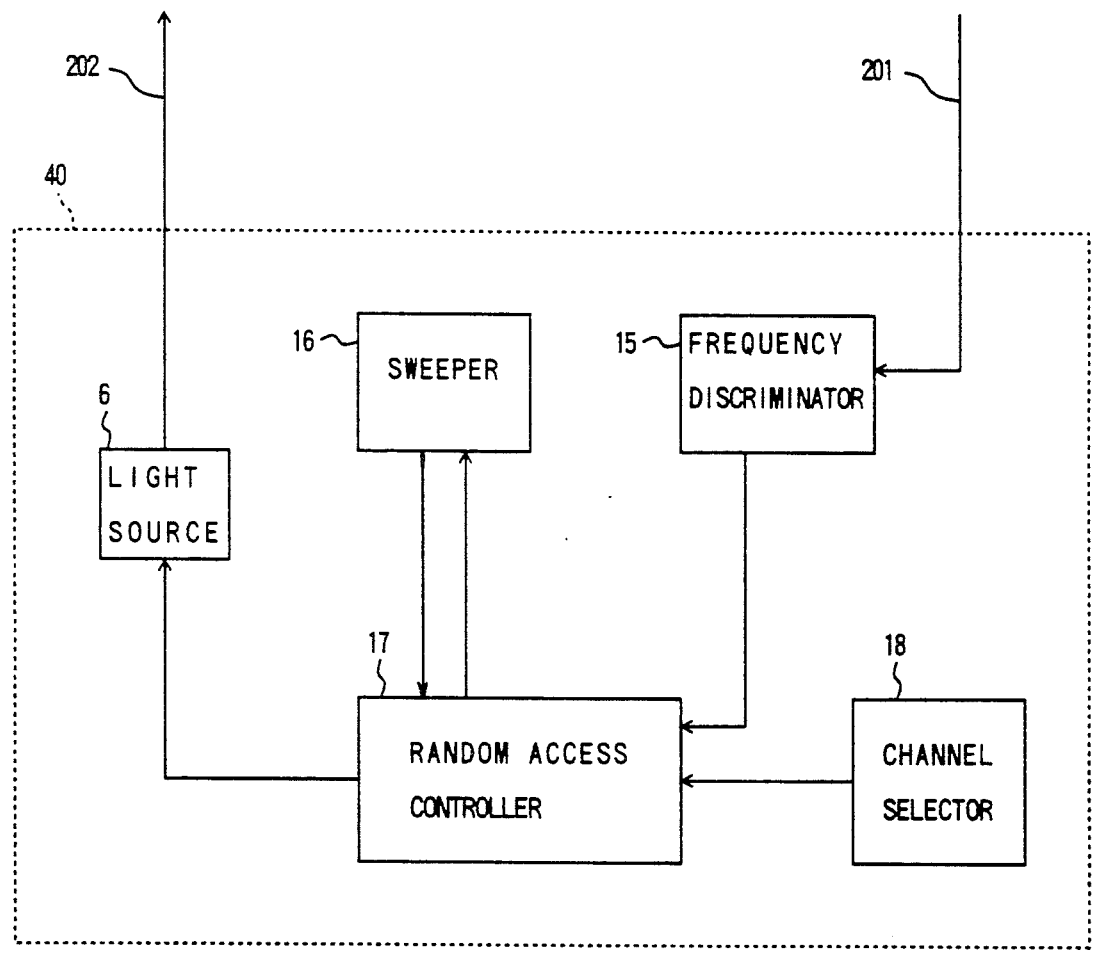
FIG. 2 is a block diagram corresponding to a part of a prior art system associated with channel selection.
Figure 3A:
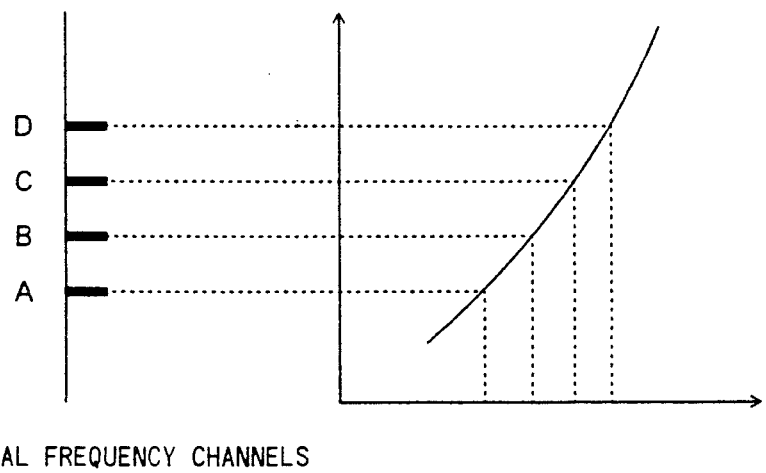
FIGS. 3A to 3C are graphs showing relationships between local oscillation optical frequency and control current with optical frequency positions allocated to channels in the prior art.
Figure 3B:
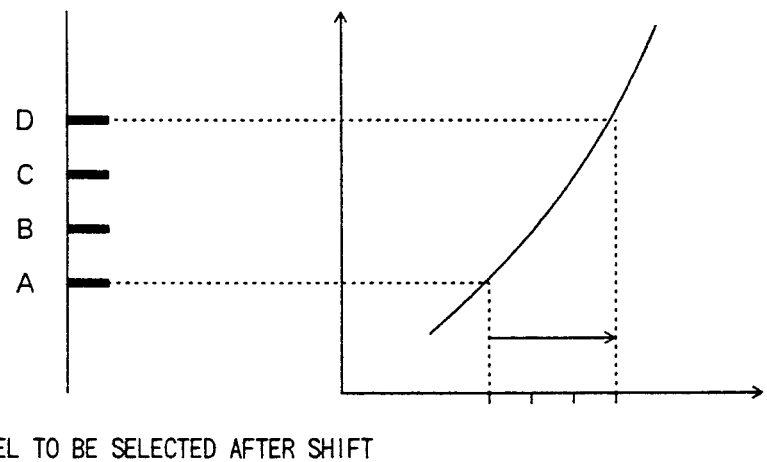
Figure 3C:
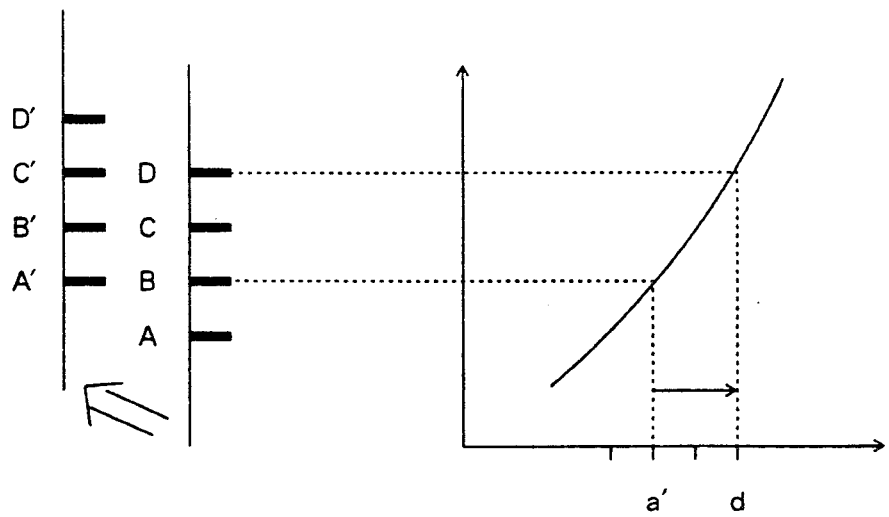

Referring first to FIG. 1, there is shown a block diagram of an optical frequency division multiplex transmission system in accordance with a first embodiment of the present invention, which includes an optical transmission system 100 and an optical reception system 200. In this optical frequency division multiplex transmission system, a light signal emitted from the optical transmission system 100 is sent to the optical reception system 200 through an optical fiber 5.

More specifically, the optical transmission system 100 includes four optical transmitters 101 to 104, an optical combiner 4 and a channel spacing stabilizer 20. The optical transmitter 101, connected to a channel 1, has a driver circuit 2 and a transmission light source 3. A transmission signal 1 of the channel 1 is sent to the driver 2 and supplied to the transmission light source 3 where the signal 1 is subjected to FSK (frequency shift keying) modulation and then sent as an optical signal to an optical combiner 4. Thus is, four optical signals, sent from the four optical transmitters 101 to 104, are supplied to the optical combiner 4, combined therein, and then sent onto the optical fiber 5. The channel spacing stabilizer 20 is provided to stabilize the optical frequencies of the respective channels with equal spacing therebetween.

The optical reception system 200, on the other hand, includes an optical tuning device 40 and an optical receiver 30. More in detail, the optical receiver 30 combines the optical signal received from the optical transmission system 100 and a local oscillation optical signal 202 from the optical tuning device 40 for selective reception, and outputs a combined signal to a demodulator circuit 13 to obtain a demodulated signal. The demodulated signal is provided as an output signal 14 of the optical reception system 200.

More concretely, the optical receiver 30 has an optical coupler 7, a photoelectric detector 8 and a preamplifier 9. The optical receiver 30 receives at the optical coupler 7 the local oscillation optical signal 202 from the optical tuning device 40 and the optical signal from the optical transmission system 100, converts the combined signal to an electrical signal at the photoelectric detector 8, and amplifies the electrical signal at the preamplifier 9 to obtain an intermediate frequency signal 201 as an output of the optical receiver 30.

The optical tuning device 40 has an intermediate frequency stabilizer circuit 10 for heterodyne reception, a channel designator 11 for channel selection, an adder 12 and a local oscillation light source 6. More in detail, the adder 12 adds a biasing current 205 received from the channel designator 11 and an AFC signal current 204 received from the intermediate frequency stabilizer circuit 10 to obtain a control current 203, and outputs the control current signal 203 to the local oscillation light source 6 to control the optical frequency of the local oscillation light source 6. Reference numeral 206 denotes an AFC switch signal.

Explanation will first be made of the operation of the entire optical reception system 200. Heterodyne reception, generally speaking, requires an AFC function of making constant a frequency difference (intermediate frequency) between the local oscillation optical signal 202 from the optical tuning device 40 and a tuned channel optical signal. To this end, the intermediate frequency stabilizer circuit 10 supplies the AFC signal current 204 to the local oscillation light source 6 on the basis of the intermediate frequency signal 201 from the optical receiver 30 to stabilize the intermediate frequency. For channel change, the channel designator 11 supplies the AFC switch signal 206 to the intermediate frequency stabilizer circuit 10 to stop the stabilizer 10 and also scans the biasing current 205 while monitoring the intermediate frequency signal 201. The channel designator 11, as soon as detecting arrival at the target channel, stops its scanning operation of the biasing current 205 and supplies the AFC switch signal 206 to the intermediate frequency stabilizer circuit 10 to again operate the stabilizer 10, at which stage the channel change is completed.

Figure 4:
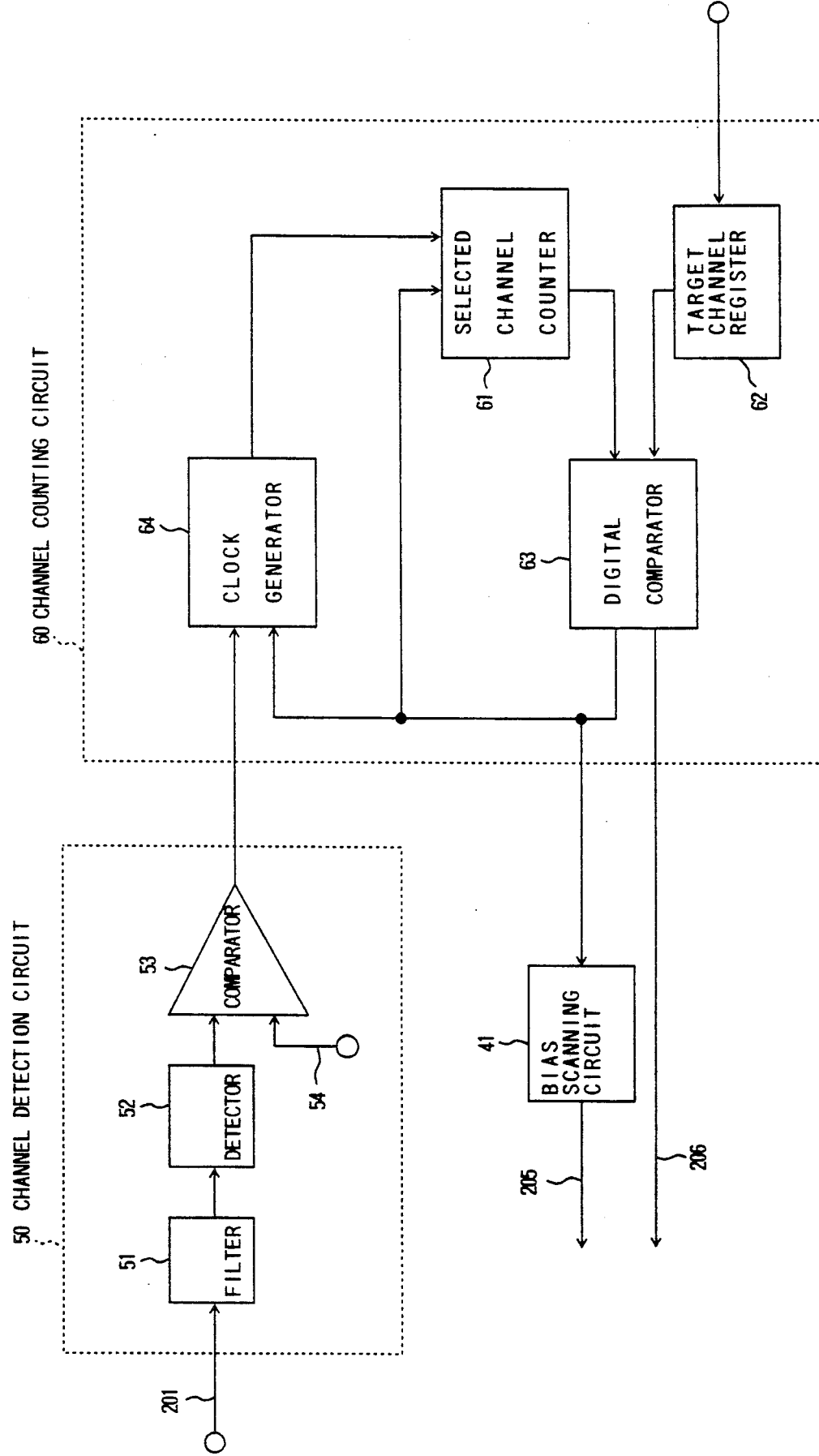
FIG. 4 is a block diagram showing a channel designation portion of the first embodiment of the present invention.

The details of the channel designator 11 are shown in FIG. 4 in the form of a block diagram. The channel designator 11 includes a channel detection circuit 50 and a channel counting circuit 60. The channel detection circuit 50, which has a low pass filter 51, an envelope detector 52 and a comparator 53, functions to detect coincidence in optical frequency between the local oscillation optical signal 202 and the transmitted optical signal. The channel counting circuit 60 has a selected-channel counter 61, a target channel register 62, a digital comparator 63 and a clock generator circuit 64. Further, reference numeral 54 denotes a clock threshold signal, 41 a bias scanning circuit.

The operation of the channel designation circuit 11 will next be explained. In the normal state, the selected-channel counter 61 and the target channel register 62 are in their equilibrium state so that the channel designation circuit 11 causes stabilization of the intermediate frequency and stoppage of the bias scanning circuit 41.

Figure 5A:
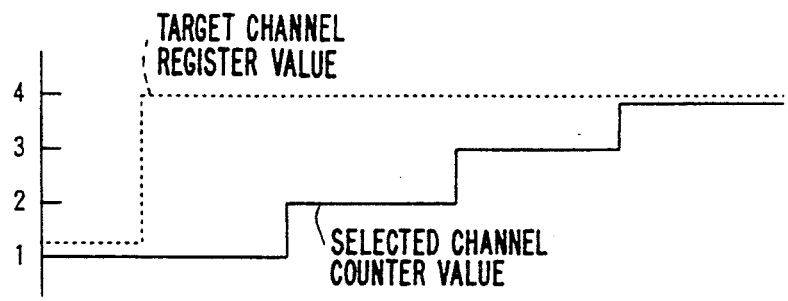
FIGS. 5A to 5E are waveforms of signals appearing in the first embodiment of the present invention useful for explaining the timing of the signals.

Next, the channel changing operation will be explained by referring to a timing chart of signals shown in FIGS. 5A to 5E in connection with an example wherein a channel 1 is now selected and it is desired to change the current channel 1 to a channel 4. Channel change starts with inputting a value 4 to the target channel register 62 presently having a value 1. In FIG. 5A, variation in the value of the target channel register 62 with time is shown by a dotted line and variation in the value of the selected-channel counter 61 with time is shown by a solid line.

First, the digital comparator 63 outputs a directional signal indicative of the fact that the target channel is located in the channel-number increasing direction and also outputs the AFC switch signal 206. The AFC switch signal 206 causes stoppage of the intermediate frequency stabilizer 10, and the directional signal causes the bias scanning circuit 41 to start its scanning operation in such a direction as increases the biasing current 205, whereby the clock generator circuit 64 is put in such a condition that it generates a clock signal from the next falling edge of an output of the comparator 53, and the selected-channel counter 61 is put in its clock waiting state in a count-up mode.

Figure 5B:
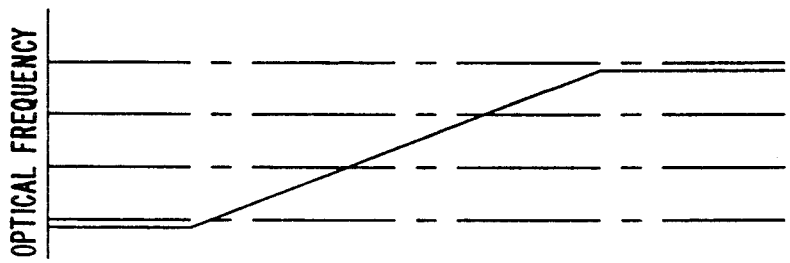
Figure 5C:
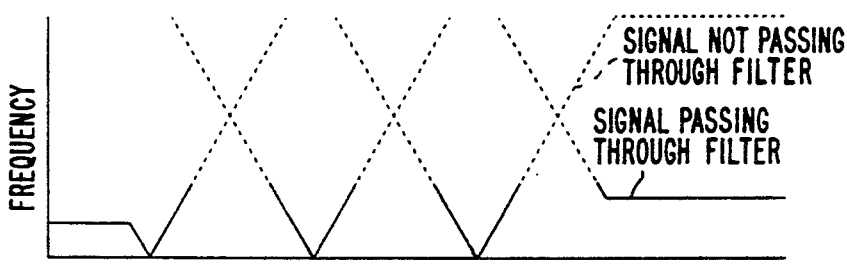
Figure 5D:
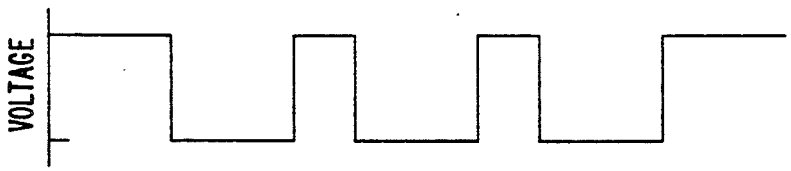
Figure 5E:
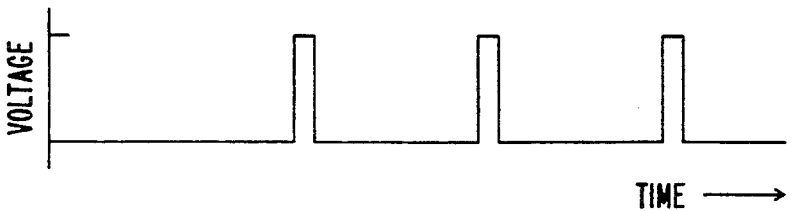

The optical frequency of the scanned local oscillation optical signal 202 varies as shown by a solid line in FIG. 5B to cross transmission optical signals shown by chain-dotted lines. The intermediate frequency signal 201 varies as shown in FIG. 5C in accordance with frequency differences between the transmission optical signal and the optical frequencies of the respective channels. In FIG. 5C, a solid line indicates a signal passing through the low pass filter 51 while dotted lines indicate signals which cannot pass through the filter 51. Next, a signal issued from the channel detection circuit 50 through the envelope detector 52 and the comparator 53 is as shown in FIG. 5D and is indicative of frequency coincidences between the local oscillation optical signal 202 and the channels of the transmitted light. In the illustrated example, the clock threshold signal 54 is used to determine a comparison level with respect to an output of the envelope detector 52 and to adjust the output timing of the comparator 53. The output signal of the channel detection circuit 50 is further passed through the clock generator circuit 64 to obtain a clock signal as shown in FIG. 5E. When the selected-channel counter 61 counts up from 1 to 4, the selected-channel counter 61 and the target channel register 62 are again put in their equilibrium state so that the digital comparator 63 again stops the bias scanning circuit 41 and outputs the AFC switch signal 206 as an activation signal.

According to such a channel changing method as mentioned above, since the channel spacing is set to be constant, not only the order of channels is changed but also the channels are not closely located to such an extent that the channels cannot be distinguished from each other in the channel detection circuit 50. Accordingly, erroneous operation of channel selection based on a deviation in optical frequency can be avoided.

Further, even when a temperature or time change in the transmission light source or in the local oscillation light source causes a variation in the optical frequency, any erroneous operation can be avoided.

In addition, there can be eliminated such a problem as variations in the characteristics of the light source or in the characteristics of the control circuit in the continuous operation leading to a variation in the local oscillation optical frequency.

In the event there occurs such a channel that does not have the transmitted optical signal, however, if channel change is made to another normal channel after passage of the channel without the transmitted optical signal, erroneous operation may be caused because the channel without the transmitted optical signal cannot be counted. This problem can be solved by interpolating clocks corresponding in number to the missing channels in the output of the clock generator circuit 64.

Figure 6:
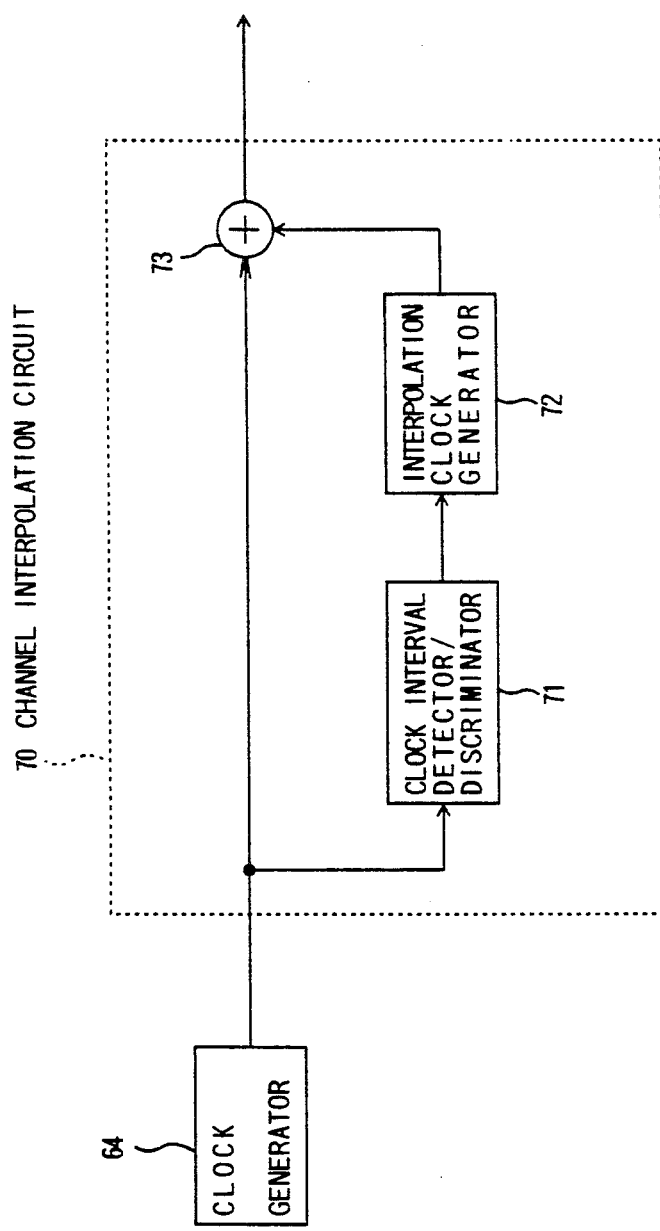
FIG. 6 is a block diagram of a channel interpolation circuit.

An example of such interpolating means is shown in FIG. 6 in the form of a block diagram of a channel interpolation circuit 70. In this case, when the detected clock interval exceeds preset time, a clock interval detector/discriminator 71 detects that, and an interpolation clock generator 72 applies a pseudo clock signal to an adder 73 to be sent to the selected-channel counter 61.

With such an arrangement, even when it is impossible to detect one or more channel signals due to the failure of the transmitter or the like, no erroneous operation can take place between normal channels, and normal channel change can be normal accomplished.

In the system of the present invention, it is necessary in the channel change mode to temporarily stop the channel maintenance function of the intermediate frequency stabilizer 10. In the present embodiment the stoppage of this function is brought about by the AFC switch signal 206. This function stoppage can also be accomplished without the use of the AFC switch signal 206 by controlling the biasing current 205 at a high speed exceeding the bandwidth of the intermediate frequency stabilizer 10.

Figure 7:
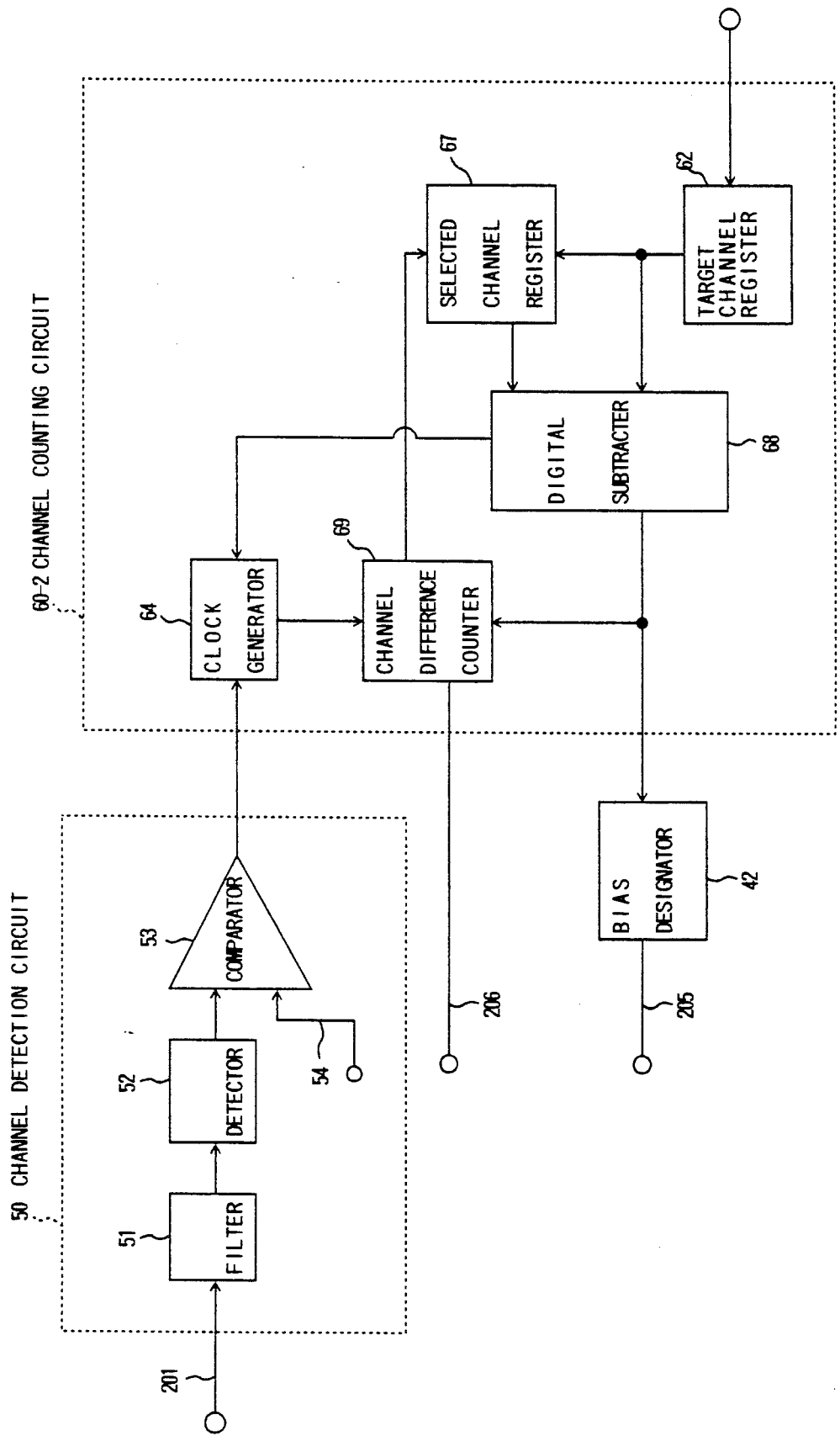
FIG. 7 is a block diagram showing a channel designation portion of a second embodiment of the present invention.

FIG. 7 shows a block diagram of another embodiment of the channel designation circuit 11 in which the channel detection circuit 50 functions to detect coincidence in optical frequency between the local oscillation optical signal 202 and the transmitted optical signal on the basis of the intermediate frequency signal 201. A channel counting circuit 60-2, on the other hand, has a selected-channel register 67, the target channel register 62, a digital subtracter 68, and a channel difference counter 69. Reference numeral 42 denotes a bias designator.

Explanation will first be made as to the normal operation for heterodyne reception. In the channel counting circuit 60-2, the selected-channel register 67 and the target channel register 62 are in the equilibrium state, and thus the channel difference counter 69 shows zero. The AFC switch signal 206 is used as an activation signal, and the bias designator 42 is stopped.

Figure 8:
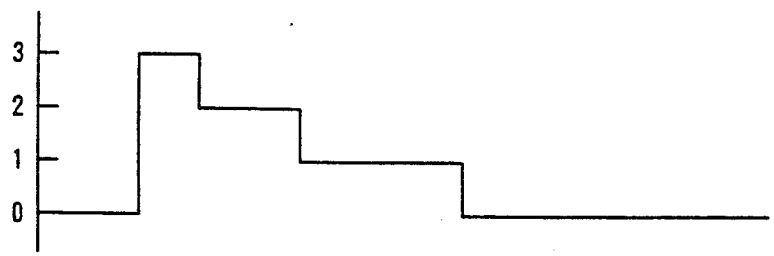
FIGS. 8A to 8E are waveforms of signals appearing in the second embodiment of the present invention useful for explaining the timing of the signals.
Figure 8:
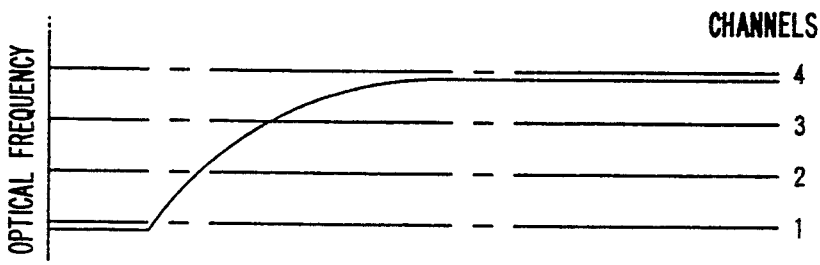
Figure 8:
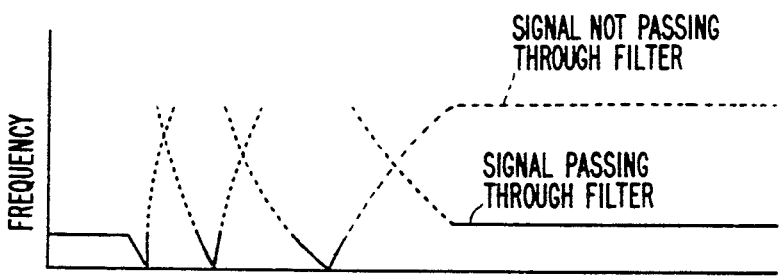
Figure 8:
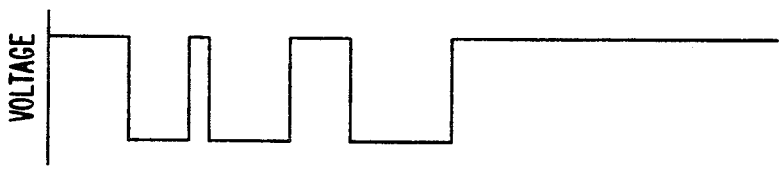
Figure 8:
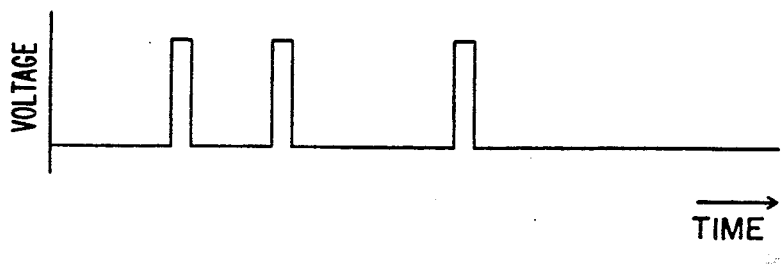

Next, the channel changing operation will be explained by referring to a timing signals of FIG. 8A to 8E in connection with an example wherein the channel 1 is now selected and channel change is desired from the current channel 1 to channel 4. As in the first embodiment, the channel change starts with loading a value 4 into the target channel register 62, presently having a value 1. First, a difference 3 between the target channel number (4) and selected channel number (1) is sent from the digital subtracter 68 to the channel difference counter 69 and to the bias designator 42. Since the channel difference counter 69, when receiving the channel number difference is no longer zero, the channel difference counter 69 outputs the AFC switch signal 206 as a stop signal. FIG. 8A shows the output of the channel difference counter 69.

The bias designator 42 converts the biasing current 205 to a value allowing arrival at the target channel on the basis of the channel number difference. For example, if the channel spacing of the transmitted optical signals is $\Delta f$ and an average interval of the corresponding biasing currents is $\Delta I$, then a relationship between $I_1$ and $I_4$ corresponding to the channels 1 and 4 is expressed as follows.

$$I_4 \approx I_1 + \Delta I \times 3 \tag{1}$$

Hence, a biasing current $I_4'$ allowing arrival at the target channel is given as $$I_4' = I_1 + \Delta I \times 3 \times A + B \tag{2}$$

where $A \geq 1$ and $B \geq 0$.

When the biasing current 205 is varied, the optical frequency of the local oscillation optical signal 202 varies as shown by a solid line in FIG. 8B while crossing the transmitted optical signals shown by chain-dotted lines in FIG. 8B. The intermediate frequency signal 201 varies as shown in FIG. 8C in accordance with the difference in optical frequency between the channels of the transmitted optical signals. In FIG. 8C, the intermediate frequency signal 201 passing through the low pass filter 51 is shown by a solid line, and the signal 201 not passing through the filter is shown by a dotted line. Then an output signal of the channel detection circuit 50, after passing through the envelope detector 52 and comparator 53, varies as shown in FIG. 8D. The output signal of the channel detection circuit 50 after passing through the clock generator 64 is such a clock signal as shown in FIG. 8E. When the channel difference counter 69 counts down from 3 to zero, the channel difference counter 69 outputs the AFC switch signal 206 as an activation signal, at which time the channel changing operation is completed. The value of the target channel register 62 is loaded into the selected-channel register 67, and the channel designator is put in its normal reception state.

As will be appreciated, the method of converting the biasing current to a level allowing arrival at the target channel in accordance with the present embodiment is not limited to the particular example shown by the above expression (2).

In the present embodiment, as in the first embodiment, such channel change can be achieved that a variation in the optical frequency does not cause erroneous operation.

Further, since the method of controlling the biasing current in the present embodiment is different from that in the first embodiment and the biasing currents can be changed at the same time, the channel changing time can be shortened.

Shown in FIGS. 9A and 9B are block diagrams of exemplary circuits which implement the bias scanning circuit 41 and bias designator 42 for outputting the biasing current 205 in the first and second embodiments, respectively. The bias scanning circuit 41 of FIG. 9A has an oscillator 43, a bias designation counter 44, a digital-to-analog converter 45 and a voltage-to-current converter 46.

In the bias scanning circuit 41, the output voltage of the digital-to-analog converter 45 and the output of the voltage-to-current converter 46, i.e., the biasing current signal 205, are determined by the value of the bias designation counter 44. The bias designation counter 44, when receiving an increment signal, counts a clock signal received from the oscillator 43 and increments its count. The then incrementing speed is determined by the frequency of the oscillator 43. The bias designation counter 44, when receiving a decrement signal, counts down the clock signal received from the oscillator 43 and when receiving a stop signal, stops.

The bias designation circuit 42 of FIG. 9B, on the other hand, has a digital-to-analog converter 45 and a voltage-to-current converter 46. The output voltage of the digital-to-analog converter 45 and the output of the voltage-to-current converter 46, i.e., the biasing current signal 205, are determined by a input digital value to the bias designation circuit 42.

When the system is started, it is assumed that the biasing current 205 is scanned from its lower side and the first detected signal is set for the channel 1. The channel 1 is set to be the first selected channel, and channel change is made from channel 1 to a desired channel. This can be accomplished with use of the bias scanning circuit 41.

The present invention may be modified in various ways in addition to the foregoing embodiments.

Although spacings between the channels have been set to be equal to each other, unequal channel spacings may be employed so long as the spacings do not exceed a predetermined fixed value. When the channel interpolation circuit is employed, however, the channel spacings are further required to be restrictively below the above predetermined constant value, but so long as variations in the channel spacings are located within a preset range, variations in the optical frequencies of the respective channels can be accommodated.

In the channel detection circuit 50, the low pass filter 51 may be replaced with any suitable band pass filter. Further, the envelope detector 52 may be replaced by a suitable square law detector or a suitable frequency discriminator. In the case where the band of the envelope detector 52, suitable square law detector or frequency discriminator is equal to the band of the low pass filter 51 or suitable band pass filter, the envelope detector 52, suitable square law detector or frequency discriminator may be commonly used also as the low pass filter 51 or suitable band pass filter.

As a second modification of the channel counting circuit 60, a circuit 60-3 as shown in FIG. 10 can be considered. In this second modification, the channel counting circuit 60-3 acts to count up from zero to the channel difference, while the first modification acts to count down from the channel difference to zero.

While the optical frequency control method of the local oscillation light source 6 controls the optical frequency control current for controlling the laser device, a temperature control method may be employed for a temperature-dependent light source.

The scanning direction of the local oscillation optical frequencies at the time of starting the system may be set so as not to be in such a direction as to increase the biasing current signal 205, but instead in such a direction as to decrease the biasing current signal 205 from its maximum.

As has been explained in the foregoing, in accordance with the present invention, in the channel changing operation, the local oscillation optical frequencies are scanned in one direction to monitor frequency coincidence between the transmitted and local oscillation optical signals, so that the local oscillation optical signal is always associated with the transmitted optical signal.

As a result, even under such an environment that the optical frequency variation exceeds the channel spacing, accurate channel selection can be achieved. Therefore, advantageously, it becomes unnecessary to accurately control the stability of the absolute optical frequency, and the present invention can be applied even under such an environment that the optical frequency drifts due to temperature and so on.

Further, since the optical frequency control of the local oscillation light source is both to scan the local oscillation optical frequency in one direction and to stably stop the scanning operation, the control circuit can be simplified. Even when the characteristics of the local oscillation light source vary with time, accurate channel selection can be advantageously achieved.

In addition, since the low pass or suitable band pass filter, the envelope or square detector and the frequency discriminator are used in the channel selection circuit, the circuit for detecting the channel passage can advantageously have a simple configuration. An additional advantage is that the optical transmission system is arranged so that the spacing between the oscillation optical frequencies of the respective optical transmitters is controllably maintained to be more than a predetermined value, whereby an optical frequency division multiplex transmission system permitting accurate channel change can be provided, which means that the requirements on the channel spacing stabilizer can be loosened.

Referring first to FIG. 11, there is shown a block diagram of an optical frequency division multiplex transmission system in accordance with another embodiment of the present invention, which includes an optical transmission system 100 and an optical reception system 200'. In this optical frequency division multiplex transmission system, a light signal emitted from the optical transmission system 100 is sent to the optical reception system 200' through an optical fiber 5.

More specifically, the optical transmission system 100 includes four optical transmitters 101 to 104, an optical combiner 4 and a channel spacing stabilizer 20. The optical transmitter 101, connected to a channel 1, has a driver circuit 2 and a transmission light source 3. A transmission signal 1 of the channel 1 is sent to the driver 2 and supplied to the transmission light source 3 where the signal 1 is subjected to FSK (frequency shift keying) modulation and then sent as an optical signal to an optical combiner 4. Thus, four optical signals, sent from the four optical transmitters 101 to 104, are supplied to the optical combiner 4, combined therein, and then sent onto the optical fiber 5. The channel spacing stabilizer 20 is provided to stabilize the optical frequencies of the respective channels with equal spacing therebetween.

The optical reception system 200', on the other hand, includes an optical tuning device 40 and an optical receiver 30. More in detail, the optical receiver 30 combines the optical signal received from the optical transmission system 100 and a local oscillation optical signal 202 from the optical tuning device 40' for selective reception, and outputs a combined signal to a demodulator circuit 13 to obtain a demodulated signal. The demodulated signal is provided as an output signal 14 of the optical reception system 200.

More concretely, the optical receiver 30 has an optical coupler 7, a photoelectric detector 8 and a preamplifier 9. The optical receiver 30 receives at the optical coupler 7 the local oscillation optical signal 202 from the channel selection device 40 and the optical signal from the optical transmission system 100, converts the combined signal to an electrical signal at the photoelectric detector 8, and amplifies the electrical signal at the preamplifier 9 to obtain an intermediate frequency signal 201 as an output of the optical receiver 30.

The optical tuning device 40' has an intermediate frequency stabilizer circuit 10' for heterodyne reception, a central frequency control circuit 10-2 for channel selection, a channel designator 11' to control these two circuits, and an adder 12. Previously stored in the channel designator 11' are relationships between the local oscillation optical frequencies and control currents, as well as a channel spacing. More in detail, the adder 12 adds a biasing current 205, received from the central frequency control circuit 10-2, and an AFC signal current 204, received from the intermediate frequency stabilizer circuit 10' to obtain a control current 203, and outputs the control current signal 203 to the local oscillation light source 6 to control the optical frequency of the local oscillation light source 6.

Explanation will first be made of the normal operation of the entire optical reception system 200'. Heterodyne reception, generally speaking, requires an AFC function of making constant a frequency difference (intermediate frequency) between the local oscillation optical signal 202 from the optical tuning device 40 and a tuned channel optical signal. To this end, the intermediate frequency stabilizer circuit 10' supplies the AFC signal current 204 to the local oscillation light source 6 on the basis of the intermediate frequency signal 201 received from the optical receiver 30 to stabilize the intermediate frequency.

The central frequency control circuit 10-2 receives a voltage signal 207 proportional to the AFC signal current 204 from the intermediate frequency stabilizer 10' and controls the biasing current 205 in such a manner that the voltage signal 207 has an average value of zero. As a result, the average value of the control current 203 coincides with the biasing current 205. Since a relationship between the control current 203 of the local oscillation light source 6 and optical frequency is previously stored, the detection of the biasing current 205 means the detection of the optical frequency of the local oscillation light source 6 and thus the detection of the optical frequency of the selected channel.

Explanation will next be made in connection with an example in which channel 1 is now selected and channel change is desired from the current channel 1 to the channel 4, and the procedure of the channel selection will be explained with reference to FIG. 12. FIG. 12 shows a relationship between the local oscillation optical frequency and biasing current, with the optical frequencies of the respective channels on the transmitter side denoted by reference symbols A, B, C and D. That is, optical frequency A corresponds to channel 1 but in actual applications, varies with temperature variations, time and so on.

For this reason, the first step of shifting the channel is to detect optical frequency of the channel 1. This can be determined by detecting the biasing current 205 from the central frequency control circuit 10-2 as already explained above in connection with normal operation. Under such a condition as shown in FIG. 12, the local oscillation optical frequency is associated with the selected channel 1, and when the optical frequency corresponding to channel 1 is varied from A to A', the channel designator 11' causes the biasing current 205 to be shifted from a to a'. Accordingly, the detected biasing current 205 has a value a', and its data is sent by the central frequency control circuit 10-2 to the channel designator 11'. The channel designator 11' can determine that the optical frequency corresponding to the selected channel 1 is A', on the bias of a curve showing the relationship between the local oscillation optical frequency and control current.

The second step is for the channel designator 11' to find the control current 203 corresponding to the optical frequency (target optical frequency) of the desired channel (channel 4 in this case). The optical frequency difference between the desired channel 4 and current selected channel 1 is obtained as the product of the known channel equi-spacing $\Delta f$ and a channel number difference of 3. That is, a target optical frequency D' is obtained by adding $\Delta f \times 3$ to the optical frequency A' obtained in the first step. Further, a value d' of the control current corresponding to the target optical frequency D' is found on the basis of the curve showing the relationship between the local oscillation frequency and control current.

The third step is to change the optical frequency of the local oscillation light source 6 to complete the channel selection. More in detail, first, the channel designator 11' temporarily stops the intermediate frequency stabilizer 10' which would act to block the channel change so as to make the AFC signal current 204 equal zero and orders the central frequency control circuit 10-2 to supply to the adder 12 the current d' corresponding to the target optical frequency obtained in the second step. As a result, the biasing current 205 supplied from the central frequency control circuit 10-2 to the adder 12 results in that target control current d' being obtained. After completion of the optical frequency shift, the intermediate frequency stabilizer 10' is again activated to return to normal operation. At this stage, the channel shift to the desired channel 4 is completed.

At the time of starting the system, the optical frequency of the local oscillation light source 6 is scanned from a lower value with use of the biasing current 205, and the first detected channel is allocated as channel 1. The first detected channel is used as the first selected channel, and channel shift is made from the selected channel to the desired channel.

The aforementioned embodiment has advantages which follow.

Firstly, in normal operation, since the central frequency control circuit 10-2 controls the biasing current 205 in such a manner that the AFC signal current 204 of the intermediate frequency stabilizer 10' becomes zero as an average, even when the optical frequency of the transmitter side is varied, the optical frequency of the local oscillation light source 6 can vary within a variable range (the variable optical frequency range of the local oscillation light source 6) of the biasing current 205 by following the variation of the transmitter optical frequency.

Secondly, since the relationship between the control current 203 of the local oscillation light source 6 and the optical frequency is previously stored, the optical frequency of the selected channel can be associated with the biasing current 205 by means of the optical frequency of the local oscillation light source 6 and the control current 203 to be supplied the local oscillation light source 6, whereby determination of the optical frequency can be advantageously achieved with a simple electric circuit.

Thirdly, channel selection is accomplished in three steps, so that, even when the optical frequency is varied, the selected channel associated with the transmitter side is used, and channel spacing stabilized at the transmitter side is used, which results in permitting channel selection to be attained without any erroneous operation.

The present invention may be modified in various ways in addition to the foregoing embodiment.

Although the foregoing embodiments have been explained in connection with the optical heterodyne detection system, an optical homodyne detection system may be employed as necessary.

The multiplexing number for the optical signal has been set to be four in the foregoing embodiments, any other number may be used.

Further, the modulation system is not restricted to FSK (frequency shift keying), but ASK (amplitude shift keying) or PSK (phase shift keying) may be employed as necessary.

Though the channel spacings have been set to be equally Δf in the transmission systems of the foregoing embodiments, they may be set to be unequal so long as they are known.

Also the optical receiver 30 may employ a polarization diversity system or a suitable reception system based on a polarization control system.

In the optical tuning device 40, as means for detecting the local oscillation optical frequency, a method of directly detecting the control current 203 may be employed in addition to the above method used in the foregoing embodiments. In this connection, further, when the biasing current 205 being always adjusted in the foregoing embodiments is fixedly used, a method for detecting the AFC current signal 204 or detecting the voltage signal 207 proportional to the AFC signal current 204 may be employed.

Further, the optical frequency control system of the local oscillation light source 6 uses the optical frequency control current leading to the laser device in the foregoing embodiments, but a temperature control system may be employed for a temperature-dependent light source.

With respect to how to determine the relationship between the selected channel and optical frequency associated with the transmitter side at the time of starting the system, the selected channel may be set not only for the lowest optical frequency but also for the highest optical frequency or for a special transmission signal for the start of the system.

As has been disclosed in the foregoing, in accordance with the present invention, since the optical frequency of the selected channel associated with the transmitter side is detected to be used as a reference, and channel selection is carried out on the basis of the reference optical frequency, even under such an environment that the optical frequency varies out of the channel spacing range, accurate channel selection can be achieved. Accordingly, it is unnecessary to accurately control the stability of the absolute optical frequency, and thus even under an environment such that the optical frequency drifts due to temperature and so on, the present invention can be utilized.

In addition, when the relationship between the optical frequency control current of the local oscillation light source is previously stored, there can be provided such a simple system that can detect and set the local oscillation optical frequency.

What is claimed is:

1. A method of performing channel change in an optical reception system including an optical receiver having an optical coupler for combining an optical frequency division multiplex signal, which has a plurality of channels with each channel being designated by a sequential channel number, with a local oscillation optical signal corresponding to a selected one of the plurality of channels, and a photoelectric detector for providing an intermediate frequency signal from the combined optical signals by means of heterodyne or homodyne detection, said method comprising the steps of:

changing the frequency of the local oscillation optical signal from the frequency of the selected channel in a direction toward the frequency of a target channel;

detecting the number of times the changing local oscillation optical signal reaches a frequency corresponding to a channel of the optical reception system; and stopping the changing of the frequency of the local oscillation optical signal when the number of channel frequencies reached by the local oscillation optical signal equals the difference between the number of the selected channel and the number of the target channel.

2. An optical tuning apparatus for changing the channel in an optical reception system including an optical receiver having an optical coupler for combining an optical frequency division multiplex signal, which has a plurality of channels with each channel being designated by a sequential channel number, with a local oscillation optical signal corresponding to a selected one of the plurality of channels, and a photoelectric detector for providing an intermediate frequency signal from the combined optical signals by means of heterodyne or homodyne detection, said apparatus comprising:

an intermediate frequency stabilizer for generating an AFC current in response to the intermediate frequency signal;

a channel designator for generating a bias current in response to the intermediate frequency signal, for supplying an AFC switch signal to the intermediate frequency stabilizer to interrupt the AFC current when a request is received to change from the selected channel to a target channel, and for changing the frequency of the local oscillation optical signal in a direction toward the frequency of the target channel until the number of times the local oscillation optical signal reaches a frequency corresponding to a channel of the optical reception system equals the difference between the number of the selected channel and the number of the target channel;

an adder for adding the AFC current with the bias current; and a local oscillation light source for generating a local oscillation optical signal in response to the added signal.

3. An optical tuning apparatus according to claim 2, wherein the channel designator comprises:

a channel detection circuit for detecting changes of the intermediate frequency signal, a channel counting circuit responsive to the output of the channel detection circuit for counting the number of times the local oscillation optical signal reaches a frequency corresponding to a channel of the optical reception system; and a bias setting circuit for varying the bias current in response to the output of the channel counting circuit.

4. An optical tuning apparatus according to claim 3, wherein the channel detection circuit comprises a filter for receiving the intermediate frequency signal, a detector coupled to the filter, and a comparator coupled to the detector, wherein the filter is a low pass filter or a band pass filter, and the detector is an envelope detector, a square law detector, or a frequency discriminator.

5. An optical tuning apparatus according to claim 3, wherein the channel counting circuit comprises a clock generator for generating a clock signal in response to the output of the channel detection circuit, a selected channel counter for counting the clock signal, a target channel register for receiving the request for channel change, and a digital comparator for comparing the output of the selected channel counter and the output of the target channel register.

6. An optical tuning apparatus according to claim 5, wherein the channel counting circuit further comprises a channel interpolation circuit for interpolating a clock signal corresponding to a missing channel in the output of the clock generator.

7. An optical tuning apparatus according to claim 3, wherein the bias setting circuit comprises a bias scanning circuit.

8. An optical tuning apparatus according to claim 3, wherein the bias setting circuit comprises a bias designator.

9. An optical tuning apparatus according to claim 8, wherein the channel counting circuit comprises a clock generator for generating a clock signal in response to the output of the channel detection circuit, a selected channel register for storing the number of the selected channel, a target channel register for receiving the request for channel change, a digital subtractor for determining the difference between the number of the selected channel and the number of the target channel, and a channel difference counter responsive to the clock signal for counting the difference number until the difference becomes zero.

10. An optical tuning apparatus for changing the channel in an optical reception system including an optical receiver having an optical coupler for combining an optical frequency division multiplex signal, which has a plurality of channels with each channel designated by a channel number, with a local oscillation optical signal corresponding to a selected one of the plurality of channels, and a photoelectric detector for providing an intermediate frequency signal from the combined optical signals by means of heterodyne or homodyne detection, said apparatus comprising:

An intermediate frequency stabilizer for generating an AFC current in response to the intermediate frequency signal;

a central frequency control circuit for generating a bias current proportional to the AFC current from the intermediate frequency stabilizer;

an adder for adding the AFC current with the bias current;

a local oscillation light source responsive to the added signal for generating the local oscillation optical signal; and a channel designator for receiving the bias current and outputting to the central frequency control circuit a signal to vary the bias current by an amount causing the frequency of the local oscillation optical signal to change by an amount equal to $f$ multiplied by the difference between the number of the selected channel and the number of the target channel, where $f$ is a fixed frequency difference between the local oscillation optical signal frequencies of adjacent channels.

11. An optical reception system comprising:

an optical receiver including an optical coupler for combining an optical frequency division multiplex signal, which has a plurality of channels with each channel designated by a channel number, with a local oscillation optical signal corresponding to a selected one of the plurality of channels, and a photoelectric detector for providing an intermediate frequency signal from the combined optical signals by means of heterodyne or homodyne detection; and an optical tuning apparatus including an intermediate frequency stabilizer for generating an AFC current in response to the intermediate frequency signal, a central frequency control circuit for generating a bias current proportional to the AFC current from the intermediate frequency stabilizer, a channel designator for receiving the bias current and outputting to the central frequency control circuit a signal to vary the bias current, an adder for adding the AFC current with the bias current, and a local oscillation light source responsive to the added signal for generating the local oscillation optical signal;

wherein the channel designator includes means responsive to a request for channel change from the selected channel to a target channel for supplying an AFC switch signal to the intermediate frequency stabilizer to interrupt the AFC current, and for changing the frequency of the local oscillation optical signal in a direction toward the frequency of the target channel until the number of times the local oscillation optical signal reaches a frequency corresponding to a channel of the optical receiver equals the difference between the number of the selected channel and the number of the target channel.

12. An optical reception system comprising:

an optical receiver including an optical coupler for combining an optical frequency division multiplex signal, which has a plurality of channels with each channel designated by a channel number, with a local oscillation optical signal corresponding to a selected one of the plurality of channels, and a photoelectric detector for providing an intermediate frequency signal from the combined optical signals by means of heterodyne or homodyne detection; and an optical tuning apparatus including an intermediate frequency stabilizer for generating an AFC current in response to the intermediate frequency signal, a channel designator for generating a bias current in response to the intermediate frequency signal, an adder for adding the AFC current with the bias current, and a local oscillation light source responsive to the added signal for generating the local oscillation optical signal;

wherein the channel designator includes means responsive to a request for channel change from the selected channel to a target channel for supplying an AFC switch signal to the intermediate frequency stabilizer to interrupt the AFC current, and for changing the frequency of the local oscillation optical signal in a direction toward the frequency of the target channel until the number of times the local oscillation optical signal reaches a frequency corresponding to a channel of the optical receiver equals the difference between the number of the selected channel and the number of the target channel.

* * * * *